Patented Aug. 7, 1945

2,381,397

UNITED STATES PATENT OFFICE 2,381,397

VULCANIZATION OF RUBBER

George E. P. Smith, Jr., Akron, Ohio, assignor to The Firestone Tire & Rubber Company, Akron, Ohio, a corporation of Ohio No Drawing. Application April 10, 1944, Serial No. 530,391

6 Claims. (Cl. 260—785)

This invention relates to the art of vulcanizing rubber, and relates more particularly to the acceleration of the vulcanization of a rubber.

The objects of the invention include a new method of vulcanizing a rubber, a rubber composition capable of vulcanizing rapidly on the application of heat thereto, and a vulcanized rubber product having desirable properties. Other objects will be manifest in the description of the invention which follows.

As a part of the present invention it has been discovered that a partially reduced 2-mercaptobenzothiazole is an efficient accelerator of the vulcanization of a rubber. The accelerators are 2-mercapto-tetrahydrobenzothiazoles of the following general formula:

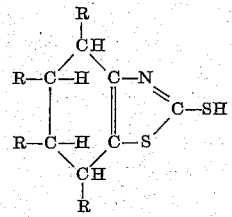

wherein R is hydrogen, an alkyl or alkoxy radical. The accelerators may, for example, be prepared by reacting an alpha chloro cyclohexanone with ammonium dithiocarbamate. Examples of thiazoles useful as accelerators are 2-mercaptotetrahydrobenzothiazole, 2-mercapto-5-methyltetrahydrobenzothiazole, 2-mercapto - 5 - ethyl-tetrahydrobenzothiazole, 2 - mercapto - 5,6 - dimethyl-tetrahydrobenzothiazole, 2-mercapto-4-ethyl - tetrahydro benzothiazole, 2 - mercapto - 4-methyl - tetrahydrobenzothiazole, 2 - mercapto-5,6-diethyl-tetrahydrobenzothiazole, 2-mercapto-4,5-diethyl-tetrahydrobenzothiazole, 2 - mercapto - 5 - methyl-6-methoxy - tetrahydrobenzothiazole, 2 - mercapto-7-ethyl-tetrahydrobenzothiazole, and 2-mercapto-5-methoxy-tetrahydrobenzothiazole.

As a specific example, 14.4 grams of 2-chlorocyclohexanone were added to 12.0 grams of freshly prepared ammonium dithiocarbamate, together with a little ether. The reaction was not violent, and the mixture was allowed to stand 15 hours at room temperature. The ether was removed by evaporation, leaving a brown solid. On extracting this solid with boiling benzene there were obtained 6.8 grams of 2-mercapto-tetrahydrobenzothiazole. On recrystallizing the product from benzene a white solid was obtained melting at 174–176° C. The product was tested as a rubber vulcanization accelerator in the following rubber formula:

| Ingredients | Parts by weight |
|---|---|
| Rubber (smoked sheets) | 100.00 |
| Sulfur | 3.00 |
| Stearic acid | 1.10 |
| Zinc oxide | 5.00 |
| 2-mercapto-tetrahydrobenzothiazole | 0.75 |

The above rubber composition was mixed in a conventional manner and then heated for 20, 40, 60 and 100 minutes at 280° F. The following physical testing data were obtained on the heated composition:

| Modulus of elasticity in lbs./in.$^2$ at elongation of 600% | | | | Tensile strength in lbs./in.$^2$ at break | | | |
|---|---|---|---|---|---|---|---|
| Minutes | | | | | | | |
| 20 | 40 | 60 | 100 | 20 | 40 | 60 | 100 |
| 500 | 650 | 700 | 700 | 2,575 | 2,625 | 2,325 | 2,550 |

A rubber composition corresponding to the above formula but containing no organic vulcanization accelerator does not cure on heating at 280° F. for the shorter periods of time. On heating such compositions for 60 or 100 minutes at this temperature the composition becomes slightly vulcanized, but is very much undercured, attaining tensile strengths of less than 1000 pounds per square inch. Hence, it is seen that the new class of accelerators is remarkably efficient in producing a fast curing rubber composition, which, upon being heated, changes into a rubber vulcanizate having high tensile strengths and other desirable properties, such as good resistance to deterioration on aging in the presence of heat or sunlight.

The new class of accelerators is equally effective in rubber tread compounds, latex compounds or other conventional types of vulcanizable compounds of rubber, reclaimed rubber or synthetic rubber. The various synthetic rubbers vulcanizable by heating with sulfur are herein considered equivalent to natural rubber, examples being butadiene polymers, isoprene polymers and various interpolymers of conjugated diolefins and vinyl compounds, such as Buna S (copolymer of butadiene and styrene) and Buna N (copolymer of butadiene and acrylonitrile). Although sulfur has hereinabove been mentioned as the preferred vulcanizing agent, other known vulcanizing agents susceptible to acceleration are contemplated.

Accelerator activators, especially of the basic type, may be employed with the new class of accelerators when extremely rapid vulcanization is desired, especially at low temperatures. The new accelerators may be employed in other proportions than the proportion shown in the above example, but will normally be utilized in the range of 0.1 to 10 parts per 100 parts of rubber.

Modification may be resorted to and obvious chemical equivalents substituted in the specific examples of the invention without departing from the spirit or the scope of the invention as defined in the appended claims.

What is claimed is:

1. The method of vulcanizing rubber which includes heating a rubber and sulfur in the presence of 2-mercapto-tetrahydrobenzothiazole.

2. A vulcanizable rubber composition including sulfur and 2-mercapto-tetrahydrobenzothiazole.

3. A vulcanized rubber product prepared by heating a rubber and sulfur in the presence of 2-mercapto-tetrahydrobenzothiazole.

4. The method of vulcanizing rubber which includes heating a rubber and sulfur in the presence of a 2-mercapto-tetrahydrobenzothiazole of the formula

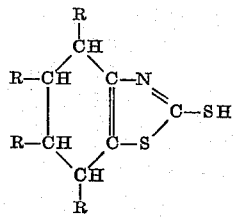

wherein R is a member of the group consisting of hydrogen, alkyl radicals and alkoxy radicals.

5. A vulcanizable rubber composition including sulfur and a 2-mercapto-tetrahydrobenzothiazole of the formula

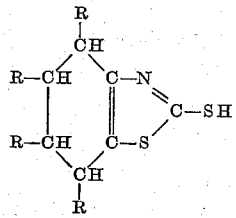

wherein R is a member of the group consisting of hydrogen, alkyl radicals and alkoxy radicals.

6. A vulcanized rubber product prepared by heating a rubber and sulfur in the presence of a 2-mercapto-tetrahydrobenzothiazole of the formula

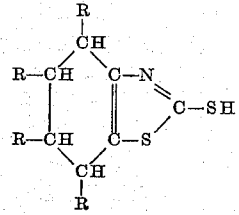

wherein R is a member of the group consisting of hydrogen, alkyl radicals and alkoxy radicals.

GEORGE E. P. SMITH, JR.